US012587059B2

(12) United States Patent
Martin et al.

(10) Patent No.: US 12,587,059 B2
(45) Date of Patent: Mar. 24, 2026

(54) ELECTRIC MOTOR COOLANT FRAME AND HEADER

(71) Applicant: ABB Schweiz AG, Baden (CH)

(72) Inventors: William E. Martin, Greenville, SC (US); John M. Zedek, Simpsonville, SC (US)

(73) Assignee: ABB Schweiz AG, Baden (CH)

( * ) Notice: Subject to any disclaimer, the term of this patent is extended or adjusted under 35 U.S.C. 154(b) by 277 days.

(21) Appl. No.: 18/297,878

(22) Filed: Apr. 10, 2023

(65) Prior Publication Data

US 2024/0339888 A1     Oct. 10, 2024

(51) Int. Cl.
*H02K 5/20* (2006.01)
*H02K 9/19* (2006.01)

(52) U.S. Cl.
CPC .............. *H02K 5/203* (2021.01); *H02K 9/19* (2013.01)

(58) Field of Classification Search
CPC ...... H02K 1/20; H02K 2201/03; H02K 5/203; H02K 9/19; H02K 9/193; H02K 9/197
See application file for complete search history.

(56) References Cited

U.S. PATENT DOCUMENTS

2014/0117798 A1* 5/2014 Coldwate ................ H02K 9/06
                                                    310/59
2014/0246177 A1   9/2014 Chamberlin et al.

2020/0185985 A1* 6/2020 Blum ....................... H02K 3/12
2022/0224190 A1* 7/2022 Moioli ................... H02K 15/14
2022/0360124 A1* 11/2022 Xing .................... H02K 15/021

FOREIGN PATENT DOCUMENTS

EP         4027489 A1     7/2022
EP         4125183 A1     2/2023

OTHER PUBLICATIONS

European Patent Office, Extended European Search Report in European Patent Application No. 24169197.1, 9 pp. (Sep. 23, 2024).

* cited by examiner

*Primary Examiner* — Christopher M Koehler
*Assistant Examiner* — Ethan Nguyen Vo
(74) *Attorney, Agent, or Firm* — Fitch Even Tabin & Flannery LLP

(57) ABSTRACT

A cooling frame for cooling an electric motor is provided. The cooling frame includes a header and a plurality of fluid conduits configured to carry a fluid and facilitate an exchange of heat between the fluid and the electric motor. The header includes at least one header port for exchanging fluid into or out from the header; a first plate comprising a central opening; and a plurality of conduit ports on the first plate positioned around the central opening, wherein each conduit port is fluidly connectable to a respective fluid conduit of the plurality of fluid conduits. The header also includes a first channel fluidly connecting the at least one header port and a first conduit port of the plurality of conduit ports, and a second channel fluidly connecting a second conduit port and the at least one header port.

20 Claims, 11 Drawing Sheets

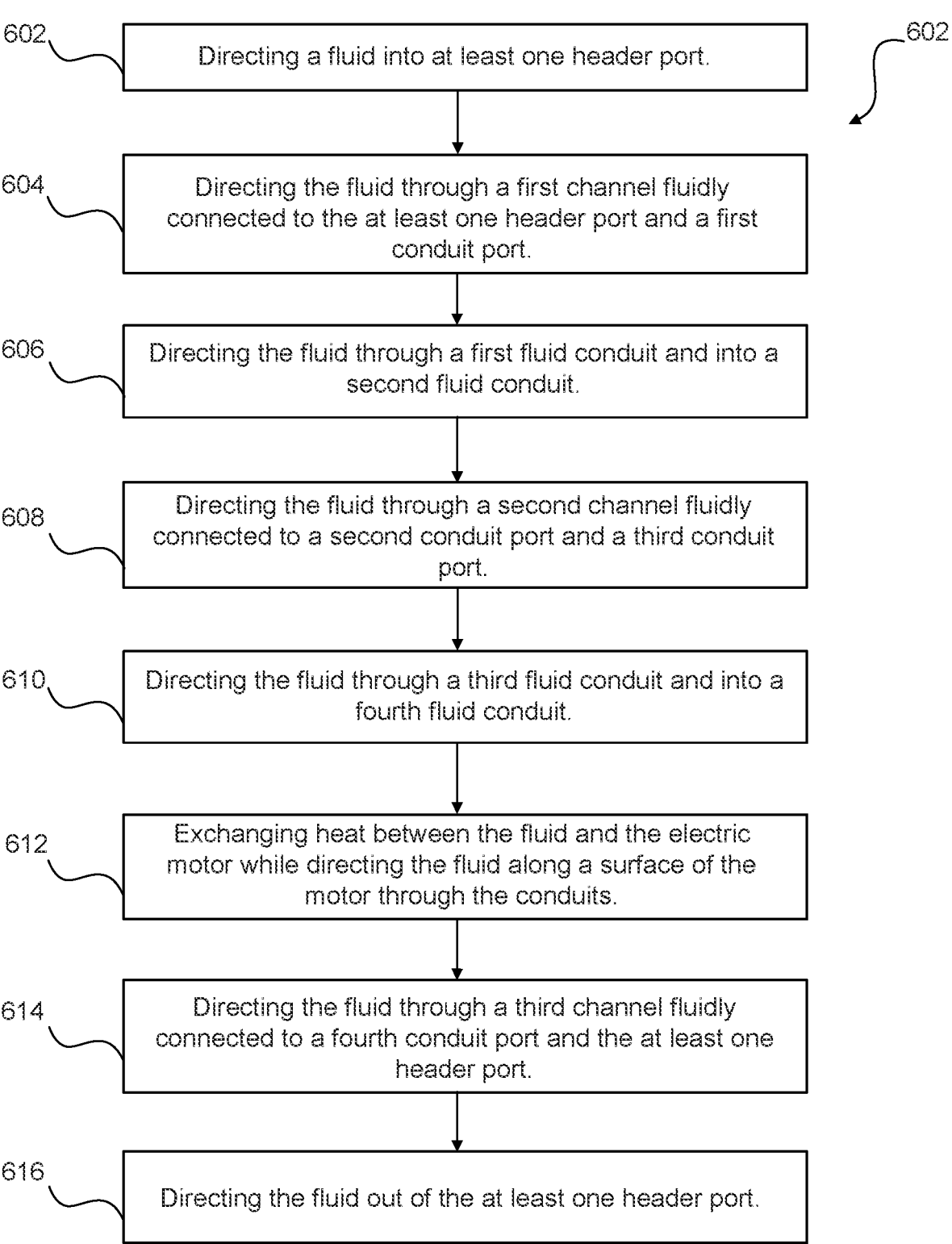

602

602 — Directing a fluid into at least one header port.

604 — Directing the fluid through a first channel fluidly connected to the at least one header port and a first conduit port.

606 — Directing the fluid through a first fluid conduit and into a second fluid conduit.

608 — Directing the fluid through a second channel fluidly connected to a second conduit port and a third conduit port.

610 — Directing the fluid through a third fluid conduit and into a fourth fluid conduit.

612 — Exchanging heat between the fluid and the electric motor while directing the fluid along a surface of the motor through the conduits.

614 — Directing the fluid through a third channel fluidly connected to a fourth conduit port and the at least one header port.

616 — Directing the fluid out of the at least one header port.

Fig. 6

ELECTRIC MOTOR COOLANT FRAME AND HEADER

FIELD

The present disclosure is directed to the field of cooling electric motors.

BACKGROUND

Electric motors generate heat as they operate, such as through rotor and stator losses. The effects of the generated heat can impact the operational efficiency and lifetime of the motor. Cooling the electric motor can help to mitigate these effects. One primary cooling medium for cooling electric motors is water. In the case of water-cooled motors, one option is a jacket cooled motor, e.g., a totally enclosed water cooled (TEWC) cooling solution. Jacket cooled motors can run in harsh and severe environments due to the fabricated enclosure, but can be less power dense depending on the size of the jacket. Moreover, typical fabricated motor frames for liquid cooling of the stator are fabricated to form a complete enclosure, and involve complex frame weldments to construct a coolant jacket around the perimeter of the stator. However, the typical frames are labor and material intensive, resulting in an expensive component cost with long lead times due to the large fabrication costs required to construct the jacket cooled motor enclosures.

SUMMARY

In an aspect, a cooling frame for cooling an electric motor is provided. The cooling frame includes a header and a plurality of fluid conduits configured to carry a fluid and facilitate an exchange of heat between the fluid and the electric motor. The header includes at least one header port for exchanging fluid into or out from the header; a first plate comprising a central opening; and a plurality of conduit ports on the first plate positioned around the central opening, wherein each conduit port is fluidly connectable to a respective fluid conduit of the plurality of fluid conduits. The header also includes a first channel fluidly connecting the at least one header port and a first conduit port of the plurality of conduit ports, and a second channel fluidly connecting a second conduit port and the at least one header port.

In an aspect, an electric motor is provided. The electric motor includes a housing and a cooling frame. The cooling frame includes a stator, a plurality of fluid conduits positioned along a surface of the stator, the plurality of fluid conduits configured to carry a fluid and facilitate an exchange of heat between the fluid and the surface of the stator, and a first header. The first header includes at least one header port for exchanging fluid into or out from the header; a first plate including a central opening and a plurality of conduit ports on the first plate positioned around the central opening. Each conduit port is fluidly connectable to a respective fluid conduit of the plurality of fluid conduits. The first header also includes a first channel fluidly connecting the at least one header port and a first conduit port of the plurality of conduit ports, and a second channel fluidly connecting a second conduit port and the at least one header port.

In an aspect, a method for cooling an electric motor is provided. The method includes directing a fluid into at least one header port; directing the fluid through a first channel fluidly connected to the at least one header port and a first conduit port; exchanging heat between the fluid and the electric motor while directing the fluid through a stator of the electric motor through the first fluid conduit and a second fluid conduit; directing the fluid through a second channel fluidly connected to a second conduit port and the at least one header port; and directing the fluid out of the at least one header port.

BRIEF DESCRIPTION OF THE DRAWINGS

Embodiments of the present disclosure will be described in even greater detail below based on the exemplary figures. The present disclosure is not limited to the exemplary embodiments. All features described and/or illustrated herein can be used alone or combined in different combinations in embodiments of the present disclosure. The features and advantages of various embodiments of the present disclosure will become apparent by reading the following detailed description with reference to the attached drawings which illustrate the following:

FIG. 6 is a flowchart for a method of cooling an electric motor in accordance with one or more examples of the present disclosure;

DETAILED DESCRIPTION

Figure 1:
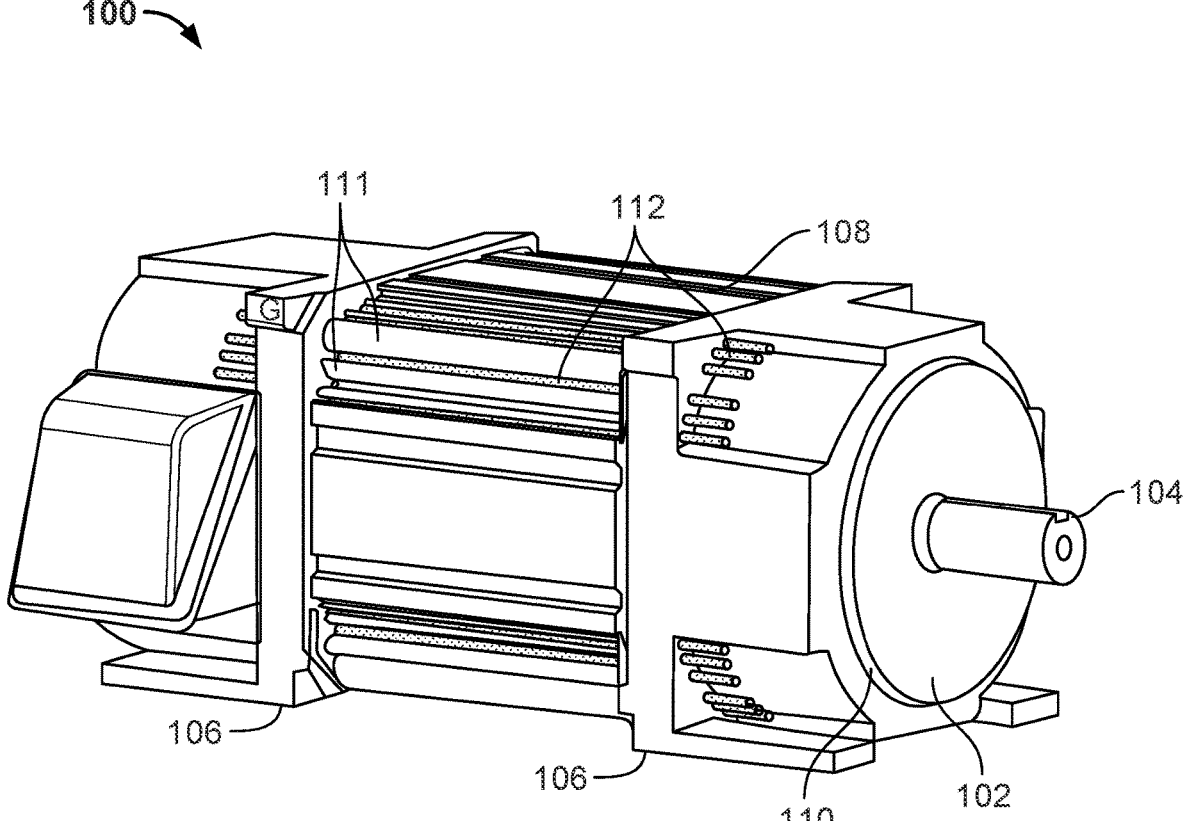
FIG. 1 is an outline view of an exemplary electric motor and stator assembly in accordance with one or more examples of the present disclosure.

The inventors of the present disclosure have recognized that liquid cooled motors are desirable in many applications, e.g., where there are high concentrations of air particulates in the surrounding environment. Liquid cooled motors can maintain optimal cooling in these applications where other cooling schemes may not. Moreover, with an effective cooling system and a cooling system of an appropriate size, it is often possible to use a smaller motor, which carries significant size, weight, and cost reductions.

Aspects of the present disclosure provide many advantages. For example, aspects of the present disclosure require less fabrication, and thereby reduce the time and lower costs to construct liquid cooled motors. Moreover, aspects of the embodiments described herein are configured to provide efficient cooling by distribute the coolant through the motor frame while requiring less fabrication. Aspects can also assist in aligning the axis of rotor or rotor shaft to the axis of the stator. Aspects can further assist in preventing coolant fluid from interfering with the electric components of the motor by reliably sealing multiple channels within the framework of the motor, and by providing coolant inlet and outlet points for the coolant circuit.

Aspects of the present disclosure also allow for the formation of a serpentine coolant flow path through the electric motor assembly. By forming a serpentine path, less coolant may be needed to perform effective cooling of the electric motor as compared to other types of water cooling systems, such as jacket cooled motors. For example, by using a serpentine path less materials are necessary than in systems designed to flush coolant over the entire surface of the motor.

Aspects of the present disclosure also provide a cooling frame than can be provided faster and with lower fabrication costs, while reliably sealing coolant from sensitive components of the motor and ensuring proper alignment and construction of the motor. For example, the headers and cooling frame reliably seal multiple cooling channels and conduits within the framework of a motor from leakage while providing a controlled inlet and outlet for the coolant to enter or exit the cooling system or circuit. Additionally, the cooling frame may include concentric rabbet fits to align the frame axis to the rotor and endplates axis and act as a mechanism for aligning the shaft axis of the rotor to the stator axis. Still further, the cooling system can be built smaller than jacket cooled motors as aspects of the present disclosure can be designed as a part of the motor itself, providing a more power dense solution. Additionally, the cooling frame allows for a separate construction of the motor and the frame, allowing for a motor to be retrofitted with the cooling frame in addition to being a part of the fabrication of the electric motor.

Aspects of the present disclosure provide headers and fluid conduits that can be installed between a housing of an electric motor assembly and an electric motor to provide effective, efficient, and condensed fluid based cooling of an electric motor. One end of a stator of the electric motor can be placed through an opening in the headers, and fluid conduits can be placed around the stator or a stator assembly on the external side of the stator, or the fluid conduits can run directly through the stator core or laminations. The fluid conduits can then be fluidly coupled/connected to channels in the headers, preferably in a fluid-tight manner. The channels/jumpers within the headers that connect the fluid conduits take fluid from one fluid conduit and provide the fluid to another, creating a serpentine coolant flow path within the cooling frame. The headers can also provide an inlet and outlet for receiving coolant into the electric motor assembly and expelling coolant from the electric motor assembly, but these inlets and outlets can also be provided directly to a fluid conduit as desired.

The headers also provide for alignment of the stator and rotor axes when installed, and ensure a desired air gap is achieved. By designing the dimensions of the header such that when a portion of the header abuts either the stator of the electric motor or the housing of the electric motor assembly, the central opening placed around the stator aligns with the axis of the rotor shaft, providing simultaneous alignment in the axial and radial directions. Therefore, the headers can assist in the structural composition of the motor. Moreover, the headers can have a scaling land, e.g., an additional plate making up part of a header, that can assist in scaling the fluid conduits to the header and even in sealing away the portion of the electric motor assembly containing the coolant circuit from the remainder of the electric motor assembly.

Examples of the presented disclosure will now be described more fully hereinafter with reference to the accompanying figures, in which some, but not all, example implementations of aspects of the present disclosure are shown. Indeed, implementations made according to aspects of the present disclosure may be exemplified in different forms and should not be construed as limited to the examples set forth herein; rather, these examples are provided as an aid to fully understanding the present disclosure. Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

Figure 3A:
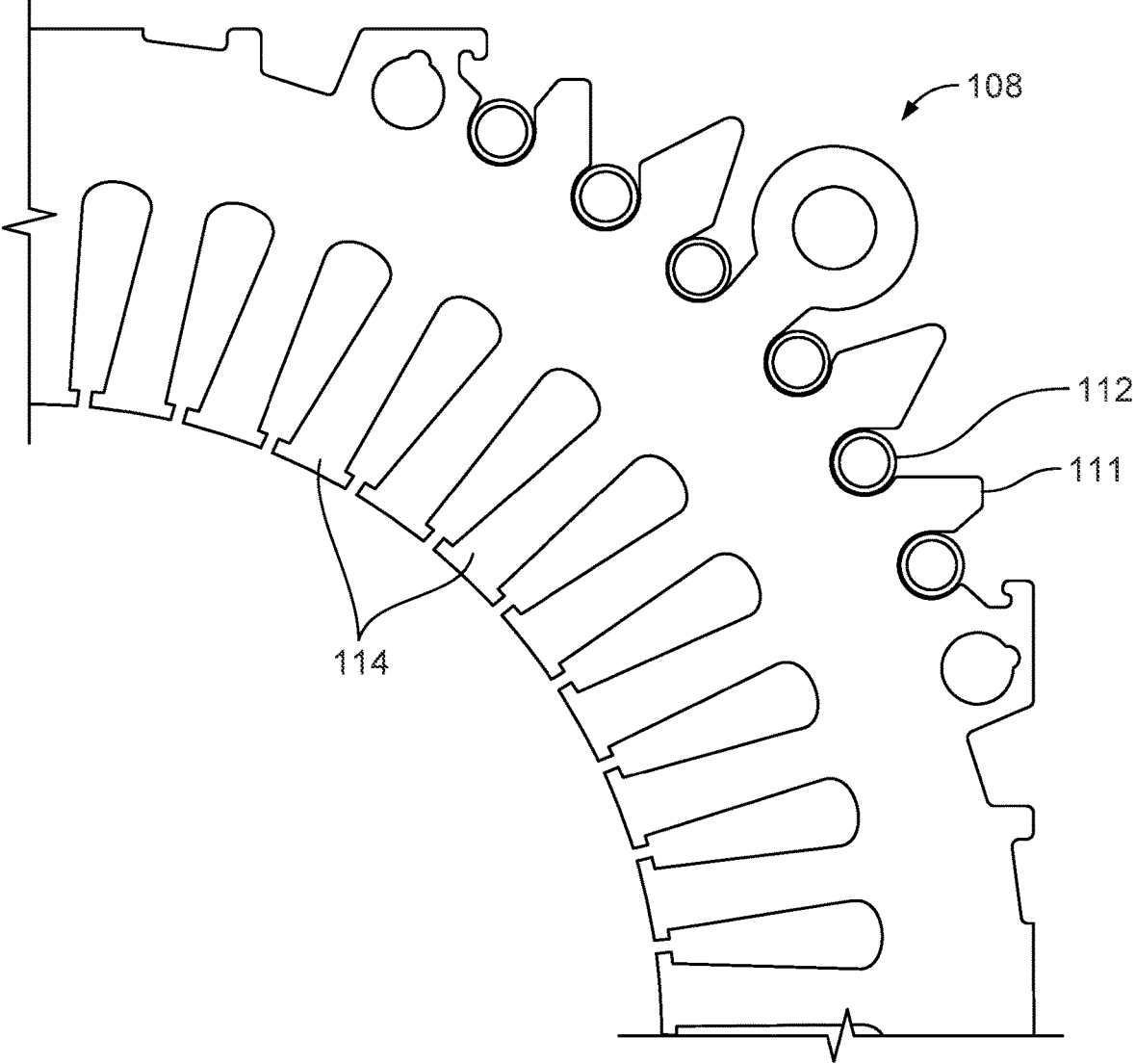
FIGS. 3A, 3B, and 3C are enlarged, detailed and partial cross section views of fluid conduits positioned with respect to the stator assembly and fins taken along lines A-B and A-C of FIG. 2 in accordance with one or more examples of the present disclosure.
Figure 3B:
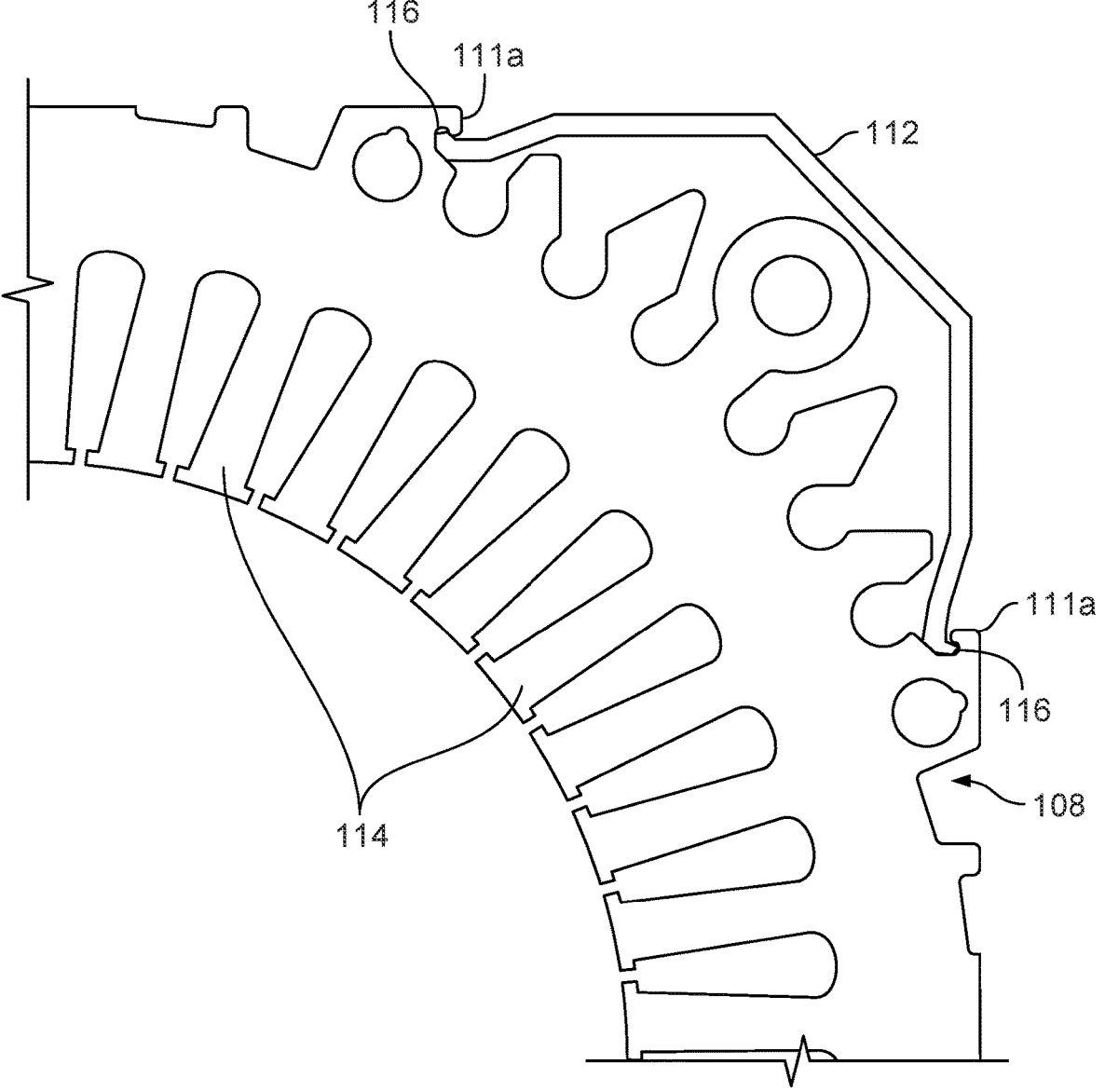
Figure 3C:
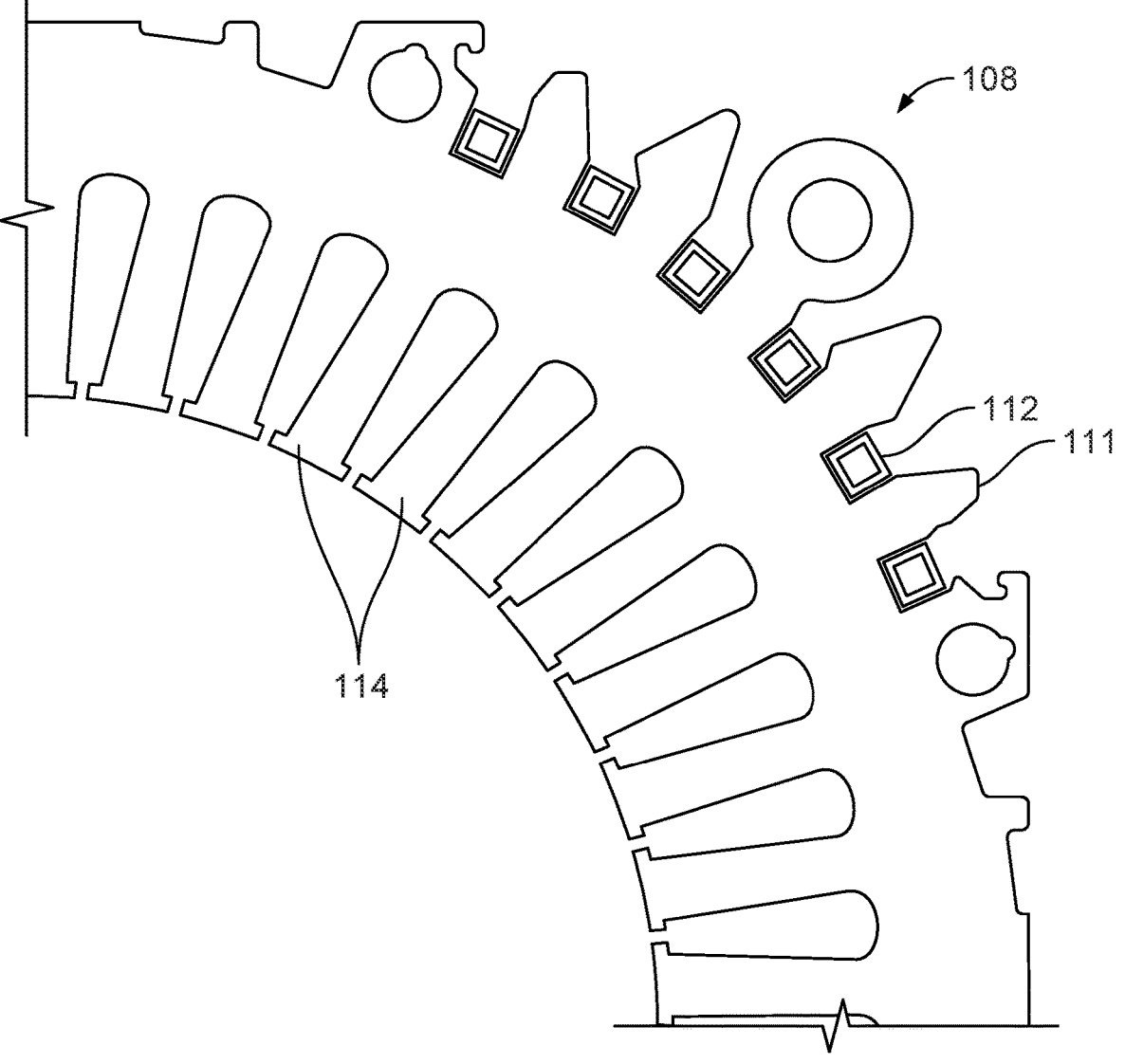
Figure 8:
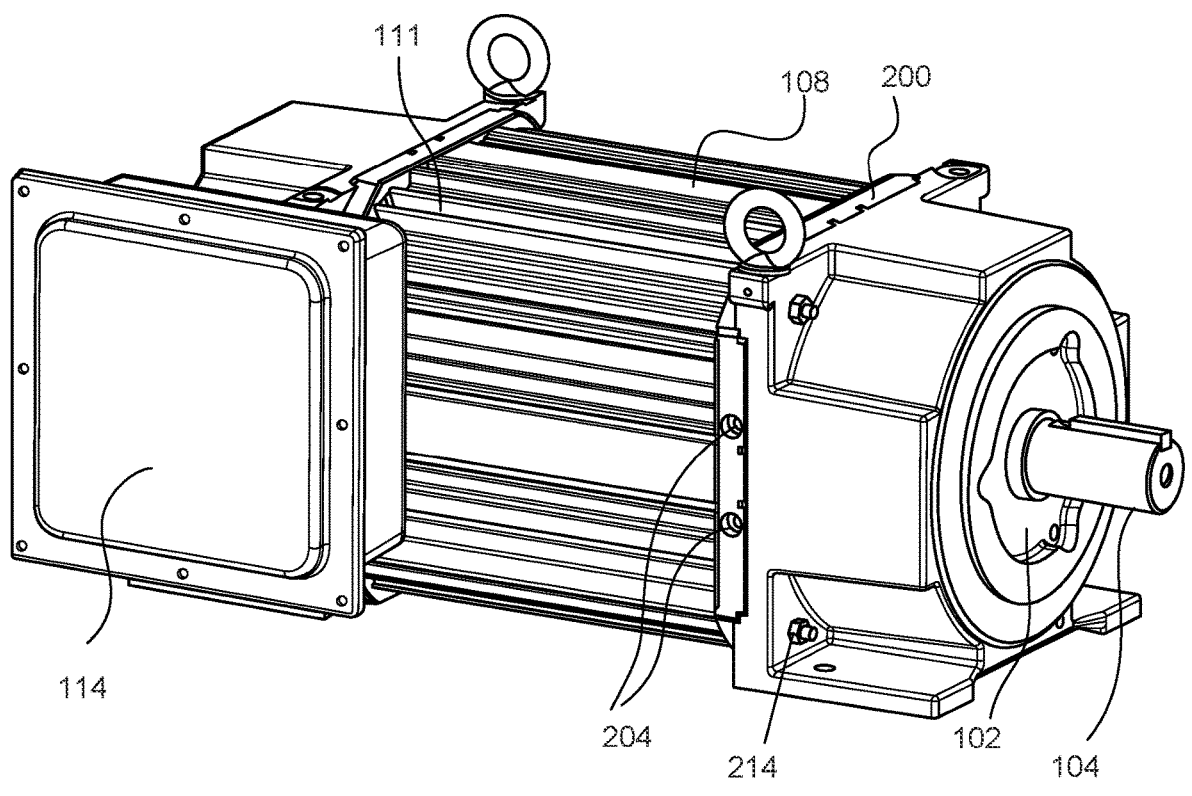
FIG. 8 is outline view of an exemplary electric motor and stator assembly in accordance with one or more examples of the present disclosure

Electric motor 100 converts electrical energy to mechanical torque that may be transmitted through a rotating shaft to be harnessed for other work. The electric motor 100 may be of any suitable construction and may utilize any suitable electromechanical operating principles such as, for example, an alternating current motor operating on single phase or poly-phase power. In the illustrated examples of FIG. 1, FIG. 8, and FIG. 10, the electric motor 100 can include an enclosure or housing that defines an enclosed space that may be generally rectangular or cylindrical in shape for accommodating the internal active components of motor 100, including a rotating motor shaft 104. The shaft 104 may be rotatably supported by the motor enclosure, e.g., through bearings 224 located at either axial end of the enclosure. The shaft 104 therefore extends along and defines a rotational axis φ of the electric motor 100. The motor 100 includes rotor 102 connected to a rotor shaft 104, and a stator 106 including the stator assembly 108 which surrounds the stator windings, as shown in FIGS. 3A, 3B, and 3C, and can be considered a part of the exterior surface of the stator 106. The rotor 102 is positioned within the stator 106, leaving an air gap 110 between the stator 106 and the rotor 102. Electric current can be supplied, e.g., from a terminal box 114, to one or more windings in the stator 106 which generates a magnetic field. The magnetic field causes the rotor 102 to rotate in response to the magnetic field, which drives the rotor shaft 104.

Figure 2:
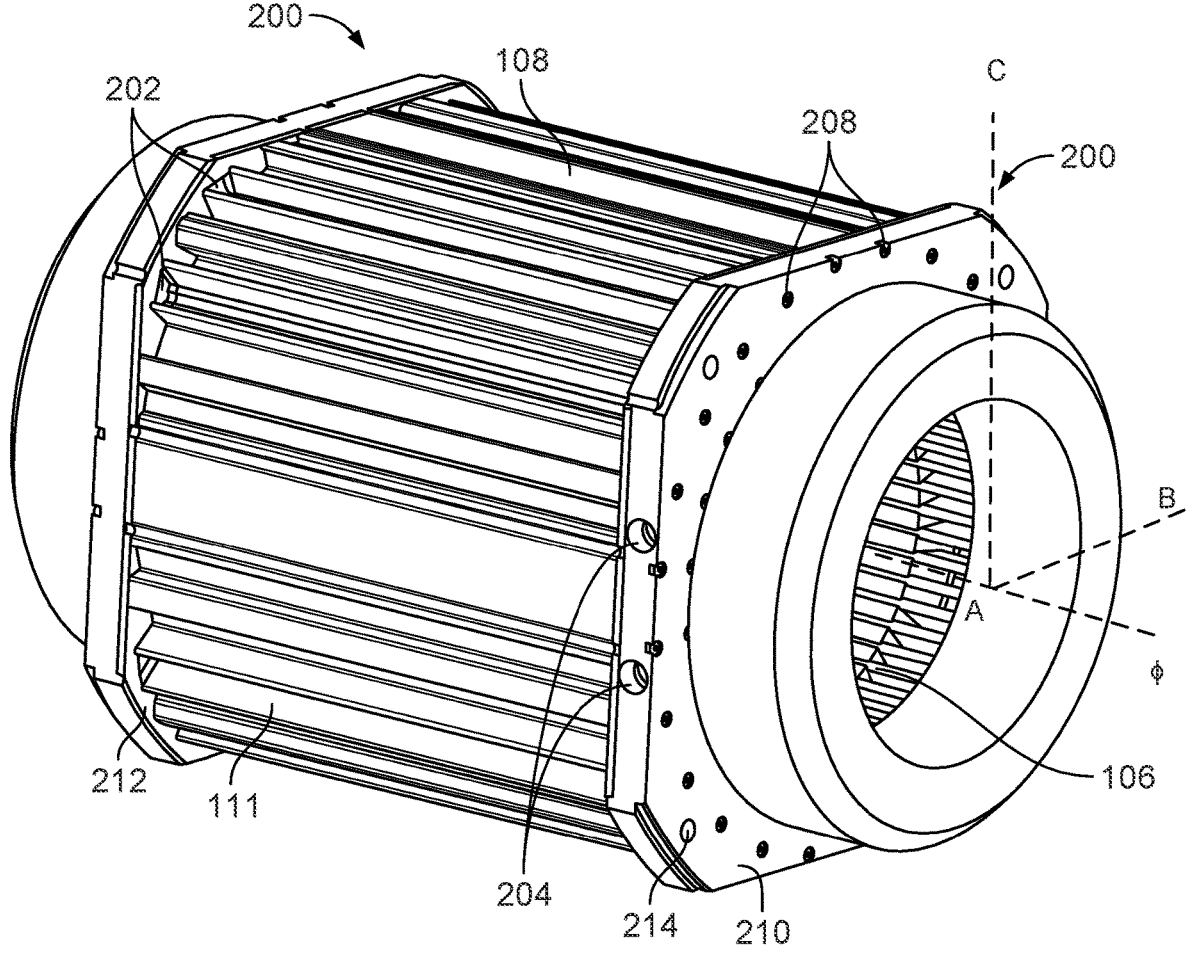
FIG. 2 is a partially disassembled outline view of a cooling frame having headers and positioned on a stator and the stator assembly in accordance with one or more examples of the present disclosure.
Figures 9, 10, 11:
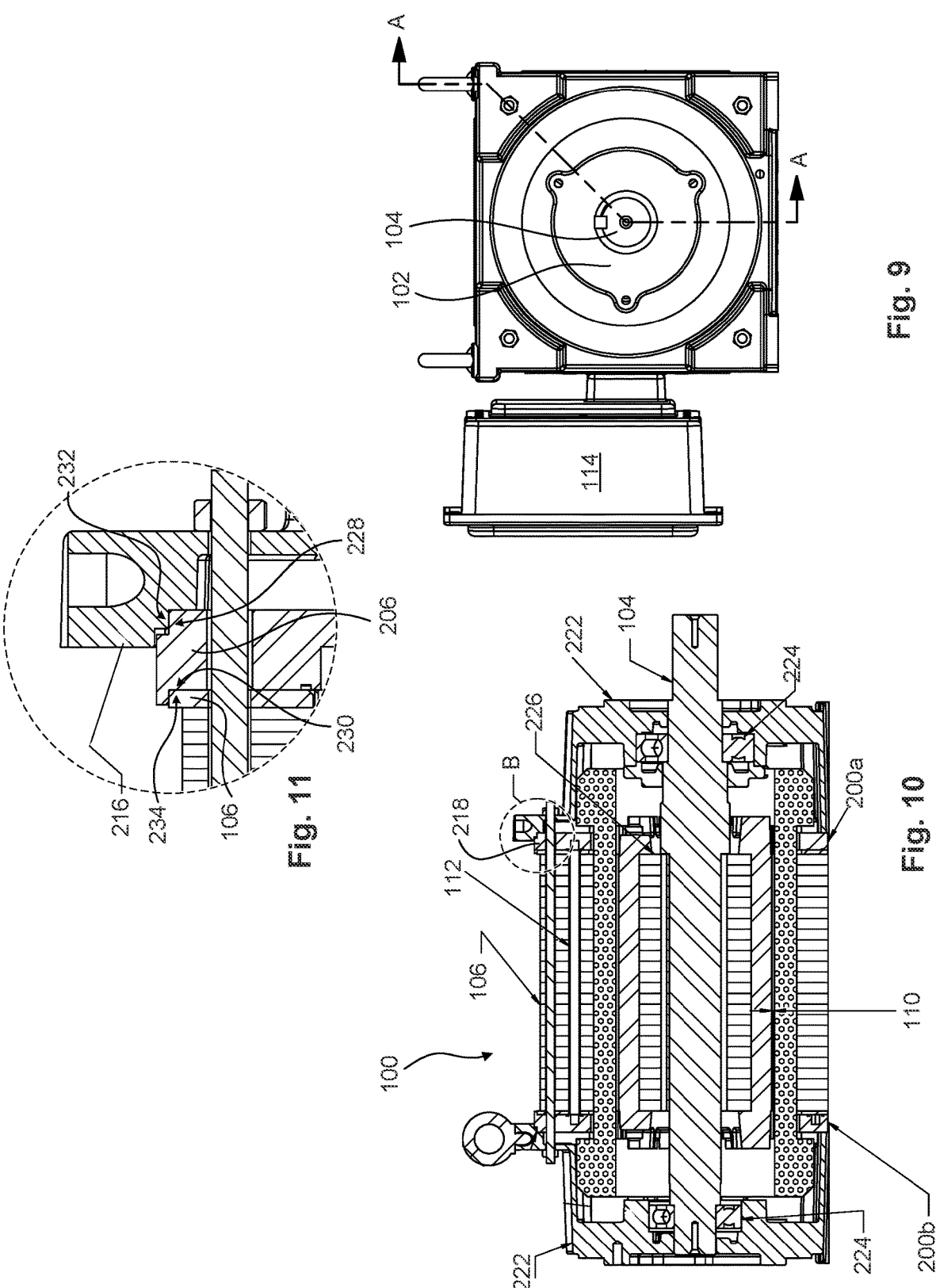
FIG. 9 is an axial end view of the electric motor of FIG. 8 in accordance with one or more examples of the present disclosure.
FIG. 10 is a cutaway view of an electric motor taken along line A-A' of FIG. 9.
FIG. 11 is an expanded view of section B of an electric motor of FIG. 10 in accordance with one or more examples of the present disclosure.

To rotate the shaft 104, a rotor 102 that may be generally cylindrical in shape is assembled to the shaft 104 and may contain a magnetic material, e.g., in the rotor core 226. The rotor 102 can be surrounded by a rotation-assisting bracket 222 and bearing 224, in addition to a stator 106, as shown in FIGS. 2 and 10, that is fixedly mounted to the motor housing 216 such that both the rotor 102 and stator 106 are located in the enclosed space. FIGS. 3A, 3B, and 3C, taken as a cross section along lines A-B and A-C as viewed along the rotational axis φ of the electric motor 100, provide a view of both the internal and external components of the motor 100. For example, the stator 106 can include a plurality of conductive windings made of, for example, copper wiring that may be received in a plurality of slots aligned parallel with the rotational axis φ and disposed radially into the inner annular surface of the stator 106. When the conductive windings are connected to a source of alternating electrical power, they generate an electromagnetic field that can rotate circumferentially about the stator 106 and around the rotational axis φ. The rotating magnetic field can attract or induce a corresponding magnetic field in the rotor 102, causing the rotor 102 and shaft 104 to rotate with respect to the rotational axis φ of the motor 100. To allow the rotor 102 to rotate with respect to the stator 106, the two elements can be physically separated by an air gap 110, e.g., an annular air gap, providing a clearance there between. Ensuring that this air gap 110 remains consistent in size and positioning helps to ensure optimum performance of the electric motor 100.

As the electric motor 100 operates, the electric motor 100 generates heat. Removing this generated heat allows the electric motor 100 to operate more efficiently. To aid in removing heat and cooling the motor, various systems can be used to exchange heat with the electric motor 100. For example, fluid coolant can be pumped or moved through a cooling frame of the electric motor 100 using a fluid supply and the fluid conduits 112. These fluid conduits 112 can be external to the stator 106, as shown in FIG. 1, or internal to the stator 106 and run through the stator 106, as in FIG. 8 and shown in FIGS. 5 and 10. The fluid conduits 112 and the fluid coolant can then provide for cooling of the electric motor 100, e.g., by conduction or convection.

As shown in FIGS. 3A, 3B, and 3C, the stator assembly 108 can be positioned on the outer surface of stator 106 (whereas the inner surface of the stator 106 can then face the air gap 110 and rotor 102). The stator assembly 108 can include the fins 111, which extend outwards from the stator assembly 108. The fins 111 can take on multiple shapes and sizes, and can be spaced apart from each other such that grooves or channels can be formed between the fins 111. The spacing between fins 111 can be irregular or regular as needed for the given circumstances, and the shape and size of the fins 111 can similarly be adapted as needed for the given circumstances. For example, as shown in FIG. 2, the fins 111 can be present in parts of stator assembly 108 and absent from other parts of the stator assembly 108, and can have variable spacings between each fin 111. The heat generated by the conductive windings of slots can be transferred, e.g., by conduction, from the inner surface of the stator 106 to the outer surface of the stator 106, e.g., stator assembly 108 and fins 111. The heat can be then be exchanged with fluid in the fluid conduits 112 which run through the fins 111 and stator assembly 108.

The fins 111 of the stator assembly can have different shapes and structures, including different spacings between the fins 111. For example, FIGS. 3A, 3B, and 3C each display the stator assembly 108 including a number of fins 111, which increases the surface area of the stator lamination assembly 108 and provides efficient heat transfer. The fins 111 can also be structured and shaped to provide recesses which accommodate various shaped fluid conduits 112 having different cross-sections, e.g., circular, rectangular, as shown in FIGS. 3A and 3C. The fins 111 can also be shaped and structured to provide for irregular fluid conduits 112, such as fluid conduits 112 which span multiple fins 111, as shown in FIG. 3B. For instance, the fin 111a of FIG. 3B includes a tooth 116 able to hold a fluid conduit 112 in place. This point of connection between the fluid conduit 112 and tooth 116 can be sealed in a fluid tight manner along with the seal between the fluid conduit 112 and the conduit port 202.

Fluid conduits 112 can carry a fluid, e.g., a liquid such as water or oil, or a gas such as hydrogen or water in a gaseous state, which may act as a coolant by drawing heat from the electric motor 100 into the fluid conduit 112 then into the fluid. These fluid conduits 112 can be run through the fins 111 of the stator assembly 108, as shown in FIG. 1, parallel to the rotational axis φ of the electric motor 100. As shown in FIGS. 3A, 3B, and 3C, the fluid conduits can take on multiple shapes and forms, and can be positioned in multiple ways with respect to fins 111 of the stator assembly. The fluid conduits 112 can be made of any material that allows for heat from the electric motor 100 to be drawn into the fluid carried by the fluid conduits 112. While the fluid conduits 112 can be run through the fins 111 of the stator assembly 108, and the fins 111 are shown as extending linearly along the electric motor 100, neither the fluid conduits 112 or the fins 111 are required to extend linearly. For example, the fluid conduits 112 could partially or completely rotate around the stator assembly 108 or extend at an angle, whether the fins 111 are also angled or rotate around the stator assembly 108 or not.

Figure 5:
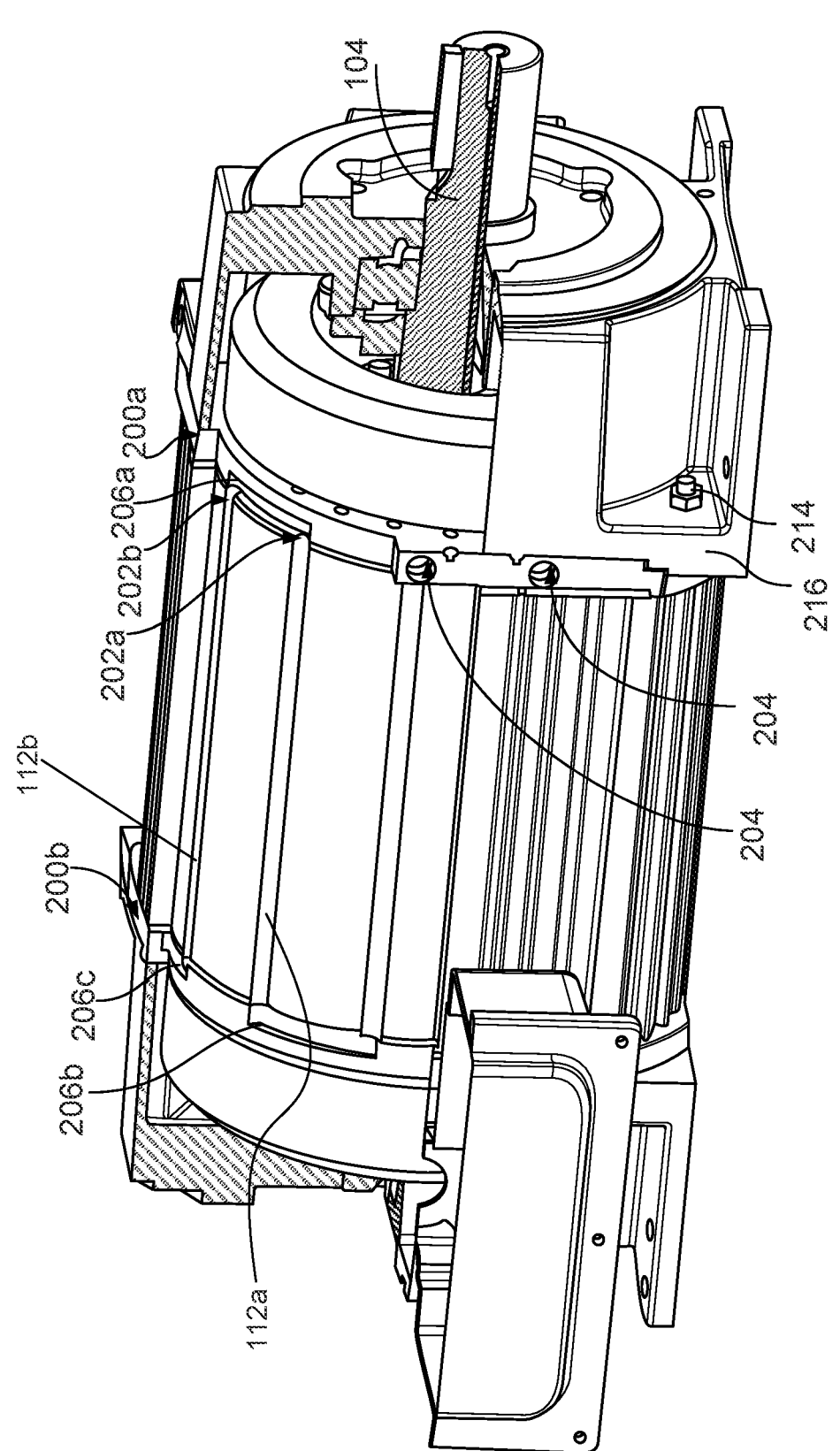
FIG. 5 is a partial cutaway view taken along the lines A-B and A-C of FIG. 2 of a partial electric motor, with a portion of the motor cut down to the level of the fluid conduits in the electric motor assembly in accordance with one or more examples of the present disclosure.

Moreover, as shown in FIG. 5, fluid conduits do not necessarily need to run through the fins 111; fluid conduits 112 can be positioned anywhere along the electric motor 100 or within the electric motor assembly that will allow for an exchange of heat from the electric motor 100 to the fluid in the fluid conduits 112. Additionally, fluid conduits 112 can be appropriately formed channels or grooves in the stator assembly 108 itself rather than added tubes or fluid lines. These appropriately formed channels or grooves may be fluidly enclosed so that they are adapted to carry the fluid and provide an exchange of heat between the fluid and the electric motor 100.

For instance, FIG. 5 shows a depiction of the electric motor 100 cut down to level of the fluid conduits 112 which are running through the stator 106. The fluid conduits 112 can be machined or drilled into the core of the stator 106, or provided in the laminations of the stator 106 which, once assembled, will form a groove or passage for the fluid conduits 112. The groove or passage through the laminations or core of the stator 106 may itself form the fluid conduit 112, or a fluid conduit 112, e.g., a tube, may be inserted into the passage. Moreover, the passage may be coated with a beneficial material to prevent damage to the passage or leakage, e.g., a rust resistant coating, a sealant, or an aerosol plastic that coats the inside of the passage.

FIG. 2 provides an example of headers 200 positioned on the stator assembly 108. The headers 200 can be mechanical appendages to each end of the motor frame that are capable of performing any of the following functions, alone or in combination: lowering the costs to construct liquid cooled motors, assisting in distributing the coolant through the motor frame, reliably sealing multiple cooling channels within the framework of a motor, providing coolant inlet and outlet points for the coolant circuit, and providing the mechanisms for aligning the shaft axis of the rotor to the stator axis. The headers 200 can be fixed to the stator 106 or merely surround the stator 106.

The headers of FIG. 2 include an end plate 210 and a sealing land 212 fastened to each other at connection point 214, which can also serve as a connection point between the cooling frame and the motor housing 216, as shown in FIG. 5. The sealing lands 212 of the headers 200 may face each other, while the end plates 210 face outward. The sealing lands 212 can provide a section of the headers 200 which allows for the channels 206 and conduit ports 202, and even the header ports 204, to be formed or provided. Moreover, the scaling lands 212, if provided facing each other, can seal off the space between the headers 200 from the rest of the motor 100, such as the stator 106 or rotor 102, reducing the risk that any leakage of fluid of the cooling frame, or external or atmospheric contaminants, will interfere with the operation of the electric motor 100, e.g., the stator 106 and rotor 102.

The headers 200 can have a header port 204 that receives fluid and provides it to the cooling system and fluid conduits 112, e.g., a fluid inlet, and/or a header port 204 that can allow fluid to leave the cooling system and fluid conduits 112. In FIG. 2, the header 200a, e.g., the drive end header, is shown as having two separate header ports 204, both of which are female ports. However, a single header port 204 may be able to function as both an inlet and outlet given an appropriate flow of fluid in a header 200, or header 200a may have an inlet header port 204 and header 200b, e.g., opposite the drive end header, may have the corresponding outlet header port 204. Moreover, a header 200 may have male ports, and may have multiple header ports 204 or pairs of header ports 204, for example if multiple isolated serpentine paths are formed between header 200a and header 200b or if each fluid conduit 112 is provided with a corresponding inlet header port 204 and outlet header port 204.

Figure 4:
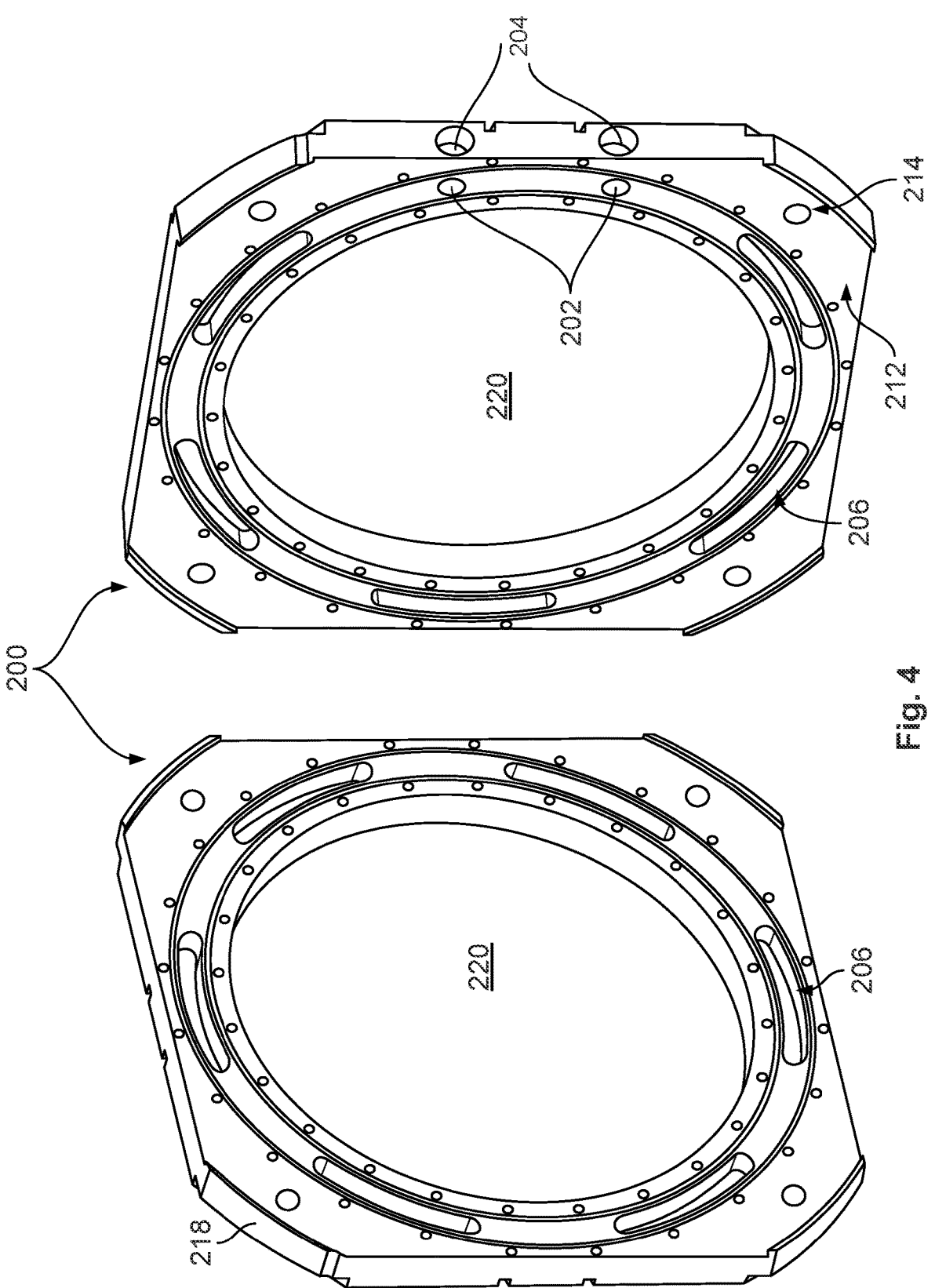
FIG. 4 is an outline view of a pair of headers suitable for use with a heat exchanging frame for an electric motor in accordance with one or more examples of the present disclosure.

As shown in FIG. 4, the headers 200 can also have multiple conduit ports 202 which can fluidly connect the fluid conduits 112 to other components on or within the headers 200. For example, the conduit ports 202 can fluidly connect the fluid conduits 112 to channels 206 such that the headers 200 can receive fluid from one fluid conduit 112 and provide that fluid to another fluid conduit 112. Moreover, the conduit ports 202 may be their own structure, such as a recess able to hold an o-ring or other type of sealant, or, for instance if a different type of connection such as a weldment is desired, the conduit ports 202 may be considered the point of interface between a component of the headers 200, e.g., channels 206, and a fluid conduit 112. The conduit ports 202 can also be positioned anywhere on the header as needed to allow for different stator assembly 108 configurations or internal motor assembly structures. For instance, in FIG. 4, the conduit ports 202 are positioned circumferentially around the central opening 220. However, conduit ports 202 may be positioned anywhere on the headers 200, whether positioned with respect to the central opening 220 or not. Additionally, conduit ports 202 can be positioned at any radial distance from the rotational axis φ of the electric motor 100 to account for the positioning of the fluid conduits 112. For example, the conduit ports 202 can be positioned at a radial distance equal to the fins 111 of the stator assembly 108 if the fluid conduits 112 run across the surface of the stator 106, or can be positioned at a distance equal to a position of the fluid conduits 112 running through the stator 106 core or laminations.

The conduit ports 202 can fluidly connect a fluid conduit 112 to an inlet header port 204 such that the fluid provided to the header 200, either from an external radiator or fluid supply, can be provided to the fluid conduits 112, allowing for a more efficient heat exchange between the motor 100 and cooling frame. Similarly, a conduit port 202 can fluidly connect a fluid conduit 112 to an outlet header port 204 allowing for a release of fluid from the cooling system, for example after the fluid has traversed the cooling frame and exchanged heat with the motor 100. The conduit ports 202 can be fluidly connected to fluid conduits 112 in a fluid-tight manner in many ways, e.g., through o-rings, gaskets, continuous welds, epoxy, and/or adhesives. Additionally, the fluid-tight fluid connection can also be performed without any structures or processes, e.g., gaskets, welding, other than the fit between the fluid conduit 112 and conduit port 202. For instance, a fluid-tight fit may be formed by the fitting of the fluid conduit 112 and conduit port 202 alone, such as a threaded connection or simply being under expansion, e.g., by use or heat.

The conduit ports 202 can also fluidly connect the fluid conduits 112 to the channels 206, e.g., coolant jumpers, of the headers 200. For instance, as shown in FIG. 5, conduit port 202a may be positioned at one end of a channel 206a and connected to a fluid conduit 112a, and another conduit port 202b may be positioned at a second end of the same channel 206a and connected to fluid conduit 112b. In this instance, the conduit ports 202 facilitate the transfer of fluid from fluid conduit 112a to fluid conduit 112b through the channel 206a.

As shown in FIGS. 4 and 5, the channels 206 can also assist in forming a serpentine path of fluid flow through the cooling frame. The channels 206 can extend within the header 200 and between two conduit ports 202, such that fluid can be transported within the header 200 between fluid conduits 112. By directing the fluid back to another fluid conduit 112 through the header 200, the fluid conduits 112 that connected to the same channel 206 will have different directions of flow, and if two fluid conduits 112 are connected to the same channel 206, those two fluid conduits 112 will have opposite directions of flow. In this way, the headers 200 help a serpentine path of flow to be formed.

As shown in FIGS. 4 and 5, if two headers 200 are used within the same cooling frame setup, and a serpentine flow path is desired, complimentary channels 206 can be formed in each header 200. For example, header 200a includes an inlet header port 204 and a channel 206a. Header 200b includes channels 206b and 206c. The fluid from inlet header port 204 flows through a fluid conduit 112 into the channel 206b, and is redirected out of the channel 206b into another fluid conduit 122. Channel 206a, being offset along the circumference of the stator 106 so as to alternate between the channels 206 of header 200b, receives as an input the fluid output by channel 206b and redirects the fluid to a further fluid conduit 112, where channel 206c receives the fluid via a fluid conduit 112b. Thereby, channel 206b is able to direct the flow of fluid towards channels 206c. Accordingly, the positioning of the channels 206 in the headers 200 can be coordinated so as to help form the serpentine path.

Figure 7:
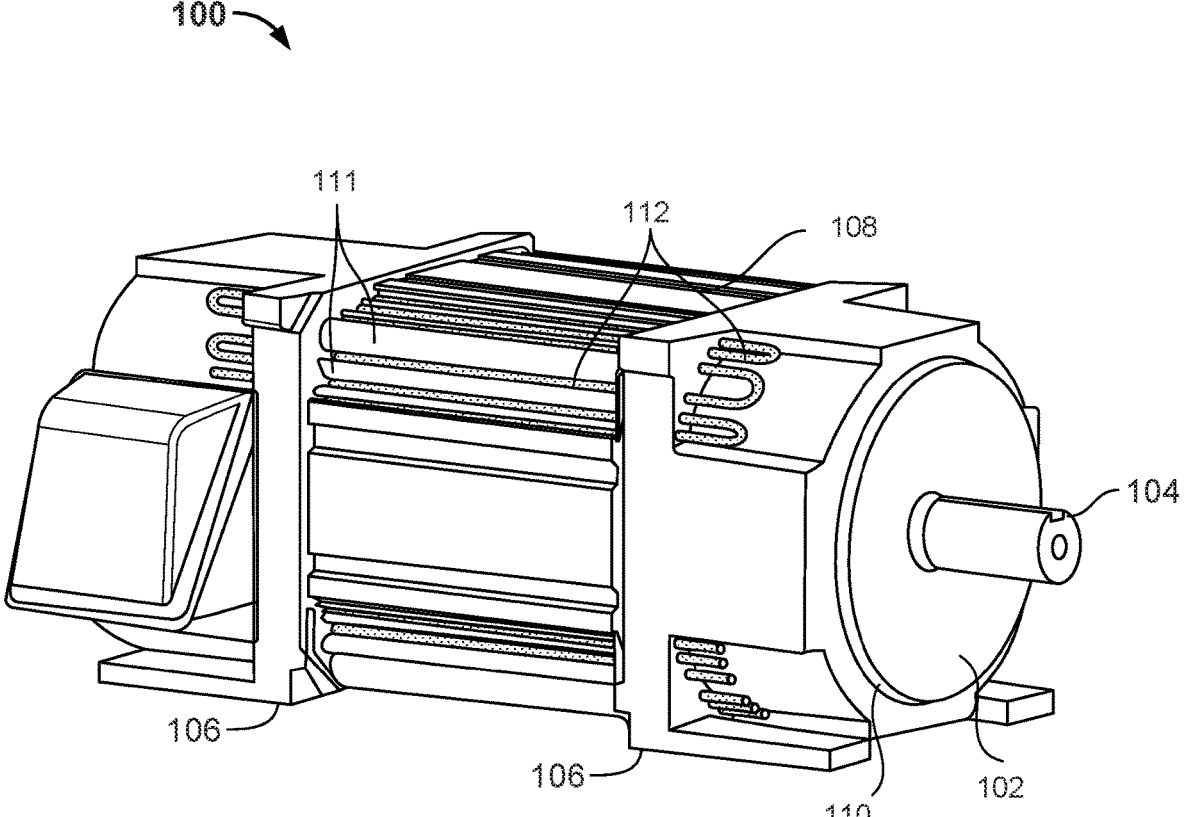
FIG. 7 is an outline view of an exemplary electric motor and stator assembly in accordance with one or more examples of the present disclosure.

When the cooling frame is utilized with only one header, a serpentine flow path can still be constructed. For example, as in FIG. 7, the fluid conduits 112 can be fluidly connected to fluidly connected via u-shaped conduits, or alternatively, conduit ports 202 of the header 200 on one end and a u-shaped conduit on the other end. The u-shaped conduits can then also be offset, with respect to the channels 200 of the header, along the circumference of stator. Additionally, as shown in FIG. 7, channels 206 can be provided that are not a part of the headers 200, e.g., are individual u-shaped fluid conduits. In this instance, headers 200 may not be necessary to perform cooling of the motor 100 or forming a serpentine path therefor. In this instance, the functionality of the headers 200 can then be replaced by a cooling frame which directs fluid through channels 206, e.g., u-shaped fluid conduits, and through fluid conduits 112 alone.

The channels 206 can assist in fluidly connecting a header inlet 204 to a fluid conduit 112. For instance, each fluid conduit may run straight across the stator 106, as shown in FIG. 1, or straight through the stator 106, as shown in FIG.

5. In this instance, the fluid conduit 112 will be connected to a header port 204 on one end which acts as an inlet, and will also be connected to a header port 204 on the other end which acts as an outlet. In this instance, no serpentine path is formed and the fluid flows into the header port 204, through a channel 206 to a conduit port 202 and into a fluid conduit 112, exchanges heat with the electric motor 100, e.g., cools the electric motor 100 and the stator 106, and flows out of the fluid conduit 112 through a conduit port 202, channel 206, and header port 204. For example, if the fluid conduit 112 is run through the fins 111, the channel 206 may simply extend linearly through the header 200 from each header port 204 to the respective conduit port 202. If the fluid conduit 112 runs through the stator 106, the channels 206 may extend from the header port 204 or header ports 204 to the respective fluid conduits 112.

Moreover, the channels 206 may connect all conduit ports 202 simultaneously by having a single continuous supply line which extends from an inlet or outlet header port 204, and then extends through and around the header 200 providing fluid to each conduit port 202 in the header 200. This same supply line may then also be fluidly connected to a second inlet or outlet header port 204, if desired. In this example, the channels 206 could then be considered to be each portion of the supply line that carries fluid between two structures, e.g., one channel 206 connects a header port 204 to a first conduit port 202, a second channel 206 connects the first conduit port 202 to a second conduit port 202, a third channel 206 connects the second conduit port 202 to a third conduit port 202, and a fourth channels connects a third conduit port 202 to a header port 204.

The channels 206 can be formed into the headers 200, e.g., into a second plate or scaling lands 212 which are affixed to the end plates 210 or formed directly into the end plates 210, or can be a fluid conduit inserted into the headers 200. For example, similar to FIG. 5, the channels 206 may be positioned between the end plates 210 and the sealing lands 212 of the headers 200, such that the sealing lands 212 of the headers 200 and the conduit ports 202 are flush with the stator assembly, while the channels 206 run behind the scaling lands 212 of the headers 200 that are flush with the stator assembly 108. Moreover, the headers 200 may include any number of channels 206, e.g., as many channels 206 as needed to correspond to the number of fluid conduits 112 or as many channels as desired to form an appropriate serpentine path. For instance, the headers 200 may have enough channels 206 to completely circumvent the electric motor 100, and help provide a serpentine flow path that traverses the entire circumference of the stator 106.

The length, width, fluid flow areas, and materials of channels 206, along with conduit ports 202, fluid conduits 112, and header ports 204, can be adjusted as needed to achieve desired flow properties of the fluid through the cooling frame. For example, the cross section area of these components can be increased or decreased as desired to achieve a more or less turbulent flow, e.g., a desired Reynolds number. Moreover, the size and shape of the components, e.g., all channels 206, need not be uniform; the channels 206 of header 200a may be larger than those of header 200b, or the different channels within header 200b may be differently sized to manage a desired flow property. Additionally, the materials from which the components of the cooling frame are made can be chosen based on an intended type of fluid coolant to be used, allowing for more specialized applications to be provided.

FIG. 2 also provides an example of fastening points 208 for fastening the connection between the fluid conduits 112 and the conduit ports 202 of the headers 200. For example, each fastening point 208 can, upon being fastened with any suitable fastener or way of fastening, e.g., screw, rivet, crimp, or weld, can squeeze the headers 200 onto the fluid conduit 112, and add pressure to the connection between the fluid conduits 112 and the conduit ports 202 of the headers 200. This can help ensure that the fluid connection between the fluid conduits 112 and the conduit ports 202 is fluid-tight, e.g., not prone to leakage. For instance, an o-ring (e.g., made of silicone rubber, polyurethane, or general elastomers) can be used to help form the fluid connection between the fluid conduit 112 and the conduit ports 202 of the headers 200. By fastening the fastening points 208, e.g., with 40 or 50 screws per header at a specified torque, the o-ring can be squeezed or crushed onto the point of connection, helping ensure that the fluid connection between the fluid conduits 112 and the conduit ports 202 of the headers 200 is fluid-tight. Moreover, the fastening points 208 may assist in fastening the headers to the stator 106 or housing 216 by fastening the headers 200 onto the stator 106, thereby squeezing or fixing the headers 200 against the stator 106 and using the stator 106 to apply pressure to the conduit port 202 connection to the fluid conduit 112.

The headers 200 can also have a shaped boundary 218, e.g., concentric fit, which provides for alignment of the rotational axis φ of the motor to the rotor 102 and stator 106 and ensures the integrity of the air gap 110. By providing the shaped boundary 218, assembly time can be reduced and accuracy can be improved, because the shaped boundary can provides a ready-for-assembly fit that aligns a bore of stator 106, header 206, and a bracket 222 to the rotor 102 and bearing 224 bores which can be provided on one or both ends of the motor 100. For example, as shown in FIGS. 4 and 11, the headers 200 may include a snubbed or slightly rounded corner as a shaped boundary 218. The shaped boundary 218 can be a machined, welded, or generally assembled edge of the header 206, and can be any desired shape that assists in providing alignment with the stator 106. For example, while FIG. 4 shows the shaped boundary 218 in a semi-circular shape, the shaped boundary 218 may also be differently shaped, e.g., circular, rectangular, octagonal, or any combination thereof. The distance on the header 200 between the central opening 220 (which surrounds the stator 106) and the shaped boundary 218 can be adjusted such that when the shaped boundary 218 abuts the housing 216 of the motor assembly, the headers 200 accurately position the stator 106 within the housing 216 of the motor assembly such that the axes of the stator 106 and rotor 102 are aligned and the desired air gap 110 between the stator 106 and the rotor 102 is achieved. The shaped boundary 218 helps to align the header 200 and stator 106 axis with the rotor 102 axis or rotor shaft 104 axis, e.g., by aligning the axis of the central opening 220 with the stator 106 axis. The accurate positioning of the air gap 110 can be very important to the operation of the electric motor 100, for example when the air gap 110 becomes a few thousandths of an inch.

FIGS. 10 and 11 provide an example of the shaped boundary providing for alignment of the stator 106. The shaped boundary 218 includes female notches 228 and male notches 230. The female notches 228 abut corresponding male notches 232 in the housing 216. The male notches 230 abut corresponding female notches 234 in the core of stator 106. The notches can be open, as shown in FIG. 10, or can insert into corresponding sections of the their abutting component in a tenon and mortise relationship, e.g., header 206 can insert into a mortise of the housing 216 or core of stator 106 using a tenon of the shaped boundary 218, the shaped boundary can provide the mortise and the core of the stator 106 or housing 216 can provide the tenon. In the example of FIG. 10, the male notches 230 of the shaped boundary 218 are designed to overlap the stator 106 and abut the female notches 234, and the male notches 232 of housing 216 are designed to overlap and abut the female notches 228 of the shaped boundary 218. However, how the notches overlap, if at all, with other components can be adjusted as desired. The shaped boundary 218 can also include irregular shaping, such as notching or rabbets. As shown in FIG. 4, the shaped boundary 218 can include a simple rabbet shown at one end of the snubbed corner, which can assist in positioning of the shaped boundary 218 within the housing 216, e.g., alignment with a plate or other irregular silhouette formed by the interior of the housing 216 that the rabbet can abut.

FIG. 6 provides a flowchart for an example process 600 for cooling the electric motor 100 using a frame. The example process 600 does not necessarily have any rigid chronological order. For example, step 612 can be performed during steps 604 through 610.

In step 602, a fluid is directed into the at least one header port. For example, fluid can be directed into the at least one header port 204 of a header 200. The fluid such as a coolant or water can be provided by another external component or reserve, e.g., a radiator, a closed circuit structure for cycling fluid coolants, or even a non-cycling system such as a submersible water pump.

In step 604, the fluid is directed through a first channel fluidly connected to the at least one header port and a first conduit port. Directing the fluid can be performed both by the structure of the frame itself which can provide a direction for the fluid to flow, but can also be performed using the pressure or flow applied to the fluid by the external component. For example, the header 200 can provide a channel 206 from which fluidly connects the header port 204 and the first conduit port 202, and the pressure or flow applied by the external component can move the fluid through the channel 206.

In step 606, the fluid is directed through a first fluid conduit and into a second fluid conduit. The fluid conduits, e.g., fluid conduits 112, may be fluidly connected by a second header 200, such as header 200b, or may be fluidly connected by a u-shaped conduit such that first and second fluid conduits 112 flow in opposite directions. The pressure or flow provided by the external component can provide the motive force, as above with respect to steps 602 and 604.

In step 608, the fluid is directed through a second channel fluidly connected to a second conduit port and a third conduit port. For example, the fluid can be directed through channel 206a or 206c as in FIG. 4.

In step 610, the fluid is directed through a third fluid conduit and into a fourth fluid conduit. The fluid conduits, e.g., fluid conduits 112, may be fluidly connected by a second header 200, such as header 200b, or may be fluidly connected by a u-shaped conduit such that first and second fluid conduits 112 carry fluid that flows in opposite directions. The pressure or flow provided by the external component can provide the motive force, as above with respect to steps 602 and 604.

In step 612, heat is exchanged heat between the fluid and the electric motor while directing the fluid along a surface of the motor through the conduits. For example, heat can be exchanged between the fluid and the electric motor while directing the fluid along a surface of the electric motor through the first fluid conduit, the second fluid conduit, the third fluid conduit, and the fourth fluid conduit. For instance, the fluid conduits, e.g. fluid conduits 112, can allow for the fluid to draw heat from the motor 100 and thereby cool the motor 100, allowing for efficient operation of the motor 100.

In step 614, the fluid is directed through a third channel fluidly connected to a fourth conduit port and the at least one header port. For example, the fluid conduit can be fluidly connected to the fourth conduit port. Accordingly, as the fluid moves through the fluid conduits 112, heat is drawn from the motor 100 and the heated fluid is carried out of the fluid conduits 112.

In step 616, the fluid is directed out of the at least one header port. The fluid which has exchanged heat with the motor 100 can be expelled from the frame via the header port 204. The fluid which has exchanged heat with the motor 100 can then be cooled if in a closed cycle system or be dumped, as more fluid can be continuously provided to the frame.

All examples and features mentioned above may be combined in any technically possible way.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A cooling frame for cooling an electric motor, the cooling frame comprising:

a stator;

a plurality of external fluid conduits positioned in contact with an external side of the stator, the plurality of external fluid conduits configured to carry a fluid and facilitate an exchange of heat between the fluid and the electric motor; and a header comprising:

at least one header port for exchanging fluid into or out from the header;

a first plate comprising a central opening;

a plurality of conduit ports on the first plate positioned around the central opening radially distanced beyond the external side of the stator, wherein each conduit port is fluidly connectable to a respective external fluid conduit of the plurality of external fluid conduits;

a first channel fluidly connecting the at least one header port and a first conduit port of the plurality of conduit ports; and a second channel fluidly connecting a second conduit port and the at least one header port.

2. The cooling frame of claim 1, wherein the header further comprises a third channel fluidly connecting a third conduit port of the plurality of conduit ports and a fourth conduit port of the plurality of conduit ports.

3. The cooling frame of claim 2, wherein the third channel is fluidly connectable to the third conduit port and the fourth conduit port such that the fluid in the third external fluid conduit flows in an opposite direction to the fluid in the fourth external fluid conduit with respect to a rotational axis of a rotor shaft of the electric motor.

4. The cooling frame of claim 1, wherein the header further comprises a plurality of fastening points configured to provide pressure on a point of connection between the plurality of conduit ports and the plurality of external fluid conduits upon being fastened.

5. The cooling frame of claim 1, wherein the first plate further comprises a shaped boundary concentric to an air gap of the electric motor, and wherein the shaped boundary is configured to position the central opening with respect to a rotational axis of a rotor shaft of the electric motor.

6. The cooling frame of claim 5, wherein the shaped boundary comprises a first notch configured to abut a housing of the electric motor and a second notch configured to abut a stator of the electric motor and, based on first notch abutment and the second notch abutment, position the central opening with respect to the stator.

7. The cooling frame of claim 1, wherein the fluid is a liquid, and each conduit port is configured to be fluidly connected to the respective external fluid conduit via a liquid-tight connection.

8. The cooling frame of claim 7, wherein the liquid-tight connection is formed using at least one of an o-ring, a gasket, an epoxy, a weld, PTFE tape, and/or a silicone adhesive.

9. The cooling frame of claim 1, wherein the central opening comprises a circumference, and wherein the plurality of conduit ports are evenly spaced around the circumference of the central opening.

10. The cooling frame of claim 1, wherein each external fluid conduit is fluidly connectable to a u-shaped segment on an end of each external fluid conduit opposite the header.

11. The cooling frame of claim 1, wherein the at least one header port comprises a first header port for receiving the fluid into the header, the first header port being fluidly connectable via the first channel to the first external fluid conduit, and a second header port for releasing the fluid from the header, the second header port being fluidly connectable via the second channel to the second external fluid conduit.

12. An electric motor comprising a housing and a cooling frame, the cooling frame comprising:

a stator;

a plurality of external fluid conduits positioned in contact with the stator, the plurality of external fluid conduits configured to carry a fluid and facilitate an exchange of heat between the fluid and the stator; and a first header comprising:

at least one header port for exchanging fluid into or out from the header;

a first plate comprising a central opening;

a plurality of conduit ports on the first plate positioned around the central opening and radially distanced beyond the external side of the stator, wherein each conduit port is fluidly connectable to a respective external fluid conduit of the plurality of external fluid conduits;

a first channel fluidly connecting the at least one header port and a first conduit port of the plurality of conduit ports; and a second channel fluidly connecting a second conduit port and the at least one header port.

13. The electric motor of claim 12, wherein the cooling frame further comprises a second header on a side of the stator opposite the first header, the second header comprising:

a second plate comprising a second central opening;

a second plurality of conduit ports on the second plate positioned around the second central opening, wherein each second conduit port is fluidly connectable to a second end of the respective external fluid conduits fluidly connected to the first plurality of conduit ports on a first end; and a third channel fluidly connectable to the first conduit port and the second conduit port.

14. The electric motor of claim 13, wherein the first header further comprises a first sealing land affixed to the first plate, wherein the second header further comprises a second sealing land affixed to the second plate, and wherein:

the first sealing land and the second sealing land face each other and are positioned within the ends of the stator; and the first sealing land and the second sealing land form a fluid-tight seal with the housing.

15. The electric motor of claim 12, wherein the first plate further comprises a shaped boundary concentric to an air gap of the electric motor, and wherein the shaped boundary is configured to position the central opening with respect to a rotational axis of a rotor shaft of the electric motor.

16. The electric motor of claim 12, wherein the first header further comprises a plurality of fastening points configured to provide pressure on a point of fluid connection between the plurality of conduit ports the plurality of external fluid conduits upon being fastened.

17. The electric motor of claim 12, wherein the stator includes a plurality of fins that extend outwardly from the external side of the stator and the plurality of external fluid conduits run through the fins.

18. A method for cooling an electric motor, the method comprising:

directing a fluid into at least one header port;

directing the fluid through a first channel fluidly connected to the at least one header port and a first conduit port;

exchanging heat between the fluid and the electric motor while directing the fluid through a stator of the electric motor through the first external fluid conduit and a second external fluid conduit;

directing the fluid through a second channel fluidly connected to a second conduit port and the at least one header port; and directing the fluid out of the at least one header port.

19. The method of claim 18, the method further comprising:

directing the fluid through a third external fluid conduit into a third conduit port;

directing the fluid through a fourth external fluid conduit adjacent to the third external fluid conduit into a fourth conduit port; and directing the fluid through the third external fluid conduit and the fourth external fluid conduit such that fluid flows in a different direction with respect to a rotational axis of a rotor shaft of the electric motor in the third external fluid conduit than in the fourth external fluid conduit.

20. The method of claim 18, wherein the at least one header port comprises an inlet header port and an outlet port, wherein directing a fluid into at least one header port further comprises directing a fluid into an inlet header port of a header plate, and wherein directing the fluid out of the at least one header port further comprises directing the fluid out of the outlet header port of the header plate.

* * * * *